United States Patent
Yu (10) Patent No.: US 9,738,340 B2
(45) Date of Patent: Aug. 22, 2017

(54) SHELL FOR BICYCLE SADDLE

(71) Applicant: VELO ENTERPRISE CO., LTD., Taichung (TW)

(72) Inventor: Tsai-Yun Yu, Taichung (TW)

(73) Assignee: VELO ENTERPRISE CO., LTD., Taichung (TW)

( * ) Notice: Subject to any disclaimer, the term of this patent is extended or adjusted under 35 U.S.C. 154(b) by 4 days.

(21) Appl. No.: 14/570,688

(22) Filed: Dec. 15, 2014

(65) Prior Publication Data

US 2015/0175228 A1    Jun. 25, 2015

(30) Foreign Application Priority Data

Dec. 25, 2013   (TW) .............................. 102148293 A (51) Int. Cl.
*B62J 1/02*         (2006.01)
*B62J 1/00*         (2006.01)

(52) U.S. Cl.
CPC .............. *B62J 1/002* (2013.01); *B62J 1/005* (2013.01); *B62J 1/007* (2013.01); *B62J 1/02* (2013.01)

(58) Field of Classification Search
CPC ... B62J 1/002; B62J 1/007; B62J 1/005; B62J 1/02
USPC ................................ 297/201, 202, 211, 215
See application file for complete search history.

(56) References Cited

U.S. PATENT DOCUMENTS

| | | | | |
|---|---|---|---|---|
| 456,792 A | * | 7/1891 | Brooks | .................... B62J 1/002 297/202 |
| 576,969 A | * | 2/1897 | Hunt | ........................ B62J 1/002 297/202 |
| 628,704 A | * | 7/1899 | Gates | ........................ B62J 1/002 297/202 |
| 4,218,090 A | * | 8/1980 | Hoffacker | .................. B62J 1/22 297/202 |
| 4,842,332 A | * | 6/1989 | Conner, Jr. | ................. B62J 1/18 297/214 |
| 4,898,422 A | * | 2/1990 | West, III | .................. B62J 1/002 297/202 |
| 5,387,024 A | * | 2/1995 | Bigolin | ...................... B62J 1/18 297/202 |
| 5,544,936 A | | 8/1996 | Bigolin | |

(Continued)

FOREIGN PATENT DOCUMENTS

| | | |
|---|---|---|
| EP | 0603138 A1 | 6/1994 |
| JP | 4414216 B2 | 2/2010 |

*Primary Examiner* — Adriana Figueroa
(74) *Attorney, Agent, or Firm* — Muncy, Geissler, Olds & Lowe, P.C.

(57) ABSTRACT

A shell for a bicycle saddle has a groove opened through top and bottom surfaces thereof, a narrow anterior portion having a front edge, and a wide posterior portion having a rear edge and divided by an imaginary longitudinal axis passing through the front and rear edges and the groove into left and right regions where two sockets are located, respectively. The groove has a longitudinal section extending along the axis, and a transverse section extending from a rear end of the longitudinal section to the left and right regions so as to form two elastic wings adjacent to the groove. Each socket has a connecting sheet and an insertion block and extends from rear and lateral edges of the wide posterior portion to a position under the bottom surface to form a space therebetween. As a result, the shell has great elasticity and structural strength.

7 Claims, 6 Drawing Sheets

(56) References Cited

U.S. PATENT DOCUMENTS

| | | | | |
|---|---|---|---|---|
| 5,692,801 | A * | 12/1997 | Yu | B62J 1/00 |
| | | | | 297/195.1 |
| 6,149,230 | A * | 11/2000 | Bontrager | B62J 1/002 |
| | | | | 297/202 |
| 6,152,524 | A * | 11/2000 | Cox | B62J 1/002 |
| | | | | 297/201 |
| 6,176,546 | B1 * | 1/2001 | Andrews | B62J 1/007 |
| | | | | 297/195.1 |
| 6,193,309 | B1 * | 2/2001 | Gootter | B62J 1/002 |
| | | | | 297/202 |
| 6,224,151 | B1 * | 5/2001 | McMullen, Jr. | B62J 1/002 |
| | | | | 297/195.1 |
| 6,672,660 | B2 * | 1/2004 | Hoshino | A47C 9/08 |
| | | | | 248/177.1 |
| 7,341,308 | B2 * | 3/2008 | Milton | B62J 1/002 |
| | | | | 297/202 |
| 7,475,940 | B2 * | 1/2009 | Riondato | B62J 1/002 |
| | | | | 297/195.1 |
| 7,699,391 | B2 * | 4/2010 | Riondato | B62J 1/007 |
| | | | | 297/202 |
| 8,480,169 | B2 * | 7/2013 | Bailie | B62J 1/10 |
| | | | | 297/201 |
| 9,284,003 | B2 * | 3/2016 | Mueller | B62J 1/007 |
| 2006/0152047 | A1 * | 7/2006 | Riondato | B62J 1/002 |
| | | | | 297/214 |
| 2011/0018315 | A1 * | 1/2011 | DeRoy | B62J 1/002 |
| | | | | 297/202 |

* cited by examiner

SHELL FOR BICYCLE SADDLE

BACKGROUND OF THE INVENTION

1. Field of the Invention

The present invention relates generally to bicycle saddles and more particularly, to a shell for a bicycle saddle.

2. Description of the Related Art

It is well known that a bicycle saddle includes a shell that forms the basic configuration of the saddle, a resilient pad covering the top of the shell for making the saddle more comfortable, a protective layer covering the resilient pad, and a supporting frame attached to the bottom of the shell for being mounted to a seat post of a bicycle.

Because the shell for the bicycle saddle must have strong structural strength to serve as a support, it is usually made of material with a sufficient hardness. For improvement of comfort, some conventional shells for bicycle saddles have specific configurations that may increase the elasticity of the shells, thereby reducing the sensation of hardness given by the saddles to the riders and improving the saddles' ability of absorbing vibration.

U.S. Pat. No. 7,341,308 B2 disclosed a shell for a bicycle saddle, which has an elongated groove extending along an imaginary longitudinal axis of the shell, such that the shell has two elastic wings located by two sides of the groove and capable of swinging elastically. However, such configuration design is not quite effective in improving the elasticity of the shell.

U.S. Pat. No. 5,692,801 disclosed a shell for a bicycle saddle, which has two sockets for insertion of two ends of the supporting frame. The two sockets are shaped as cantilevers extending from two opposite inner surfaces of the shell respectively, thereby capable of swinging elastically so as to improve the shell's ability of absorbing vibration. However, the connecting areas between the sockets and the inner surfaces of the shell are too small to be strong enough in structure, so the sockets are liable to be fractured. Besides, the inner surfaces of the shell are supported by the supporting frame through the sockets, so the section from the sockets to a rear edge of the shell is almost inflexible.

U.S. Pat. No. 5,544,936 disclosed a shell for a bicycle saddle, which also has sockets similar to that mentioned in the aforesaid U.S. Pat. No. 5,692,801 for insertion of two ends of the supporting frame and increasing the elasticity of the shell. The shell has relatively larger connecting areas between the sockets and the inner surfaces, and therefore the sockets are less possible to be fractured, but this design may cause higher material cost in manufacturing.

SUMMARY OF THE INVENTION

The present invention has been accomplished in view of the above-noted circumstances. It is an objective of the present invention to provide a shell for a bicycle saddle, which has great elasticity and structural strength.

To attain the above objective, the present invention provides a shell for a bicycle saddle, which comprises a body provided with a top surface, a bottom surface, a groove opened through the top surface and the bottom surface, a narrow anterior portion for fitting between a cyclist's crotch, a wide posterior portion for supporting the cyclist's buttocks, and two sockets for insertion of a supporting frame therein. The narrow anterior portion has a front edge. The wide posterior portion has a rear edge and two lateral edges extending from two ends of the rear edge substantially toward the front edge. The body is defined with an imaginary longitudinal axis which substantially passes through the front edge, the rear edge and the groove and divides the wide posterior portion into a left region and a right region. The groove is provided at the wide posterior portion with a longitudinal section and a transverse section. The longitudinal section has a front end and a rear end and extends from the front end substantially along the imaginary longitudinal axis toward the rear edge to the rear end. The transverse section extends from the rear end of the longitudinal section to the left region and the right region of the wide posterior portion so that the wide posterior portion has two elastic wings adjacent to the groove. The two sockets are located at the left region and the right region of the wide posterior portion, respectively. Each of the sockets has a connecting sheet connected with the rear edge and one of the lateral edges of the wide posterior portion and extending to a position under the bottom surface, and an insertion block connected with the connecting sheet. A space is provided between each of the sockets and the bottom surface.

As a result, the groove not only makes the left region and the right region of the wide posterior portion swingable elastically at outer sides thereof, but also provides the two elastic wings capable of swinging elastically to the left region and the right region at inner sides thereof. In addition, the two sockets are also swingable elastically. Therefore, the shell for the bicycle saddle provided by the present invention has great elasticity. Besides, resulted from the feature that the two sockets are connected with the rear edge and the lateral edges of the wide posterior portion, the sockets can be configured to be relatively smaller in size but connected with the wide posterior portion firmly, thereby having great structural strength, less possibility of fracture, and cost saving in material. Furthermore, the wide posterior portion is supported by the supporting frame through the two sockets at the junctures of the rear edge and the two sockets; this means the supporting frame fulcrums the wide posterior portion at the rear edge thereof. Such configuration design makes almost the whole wide posterior portion elastic, and also improves the elasticity of the narrow anterior portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
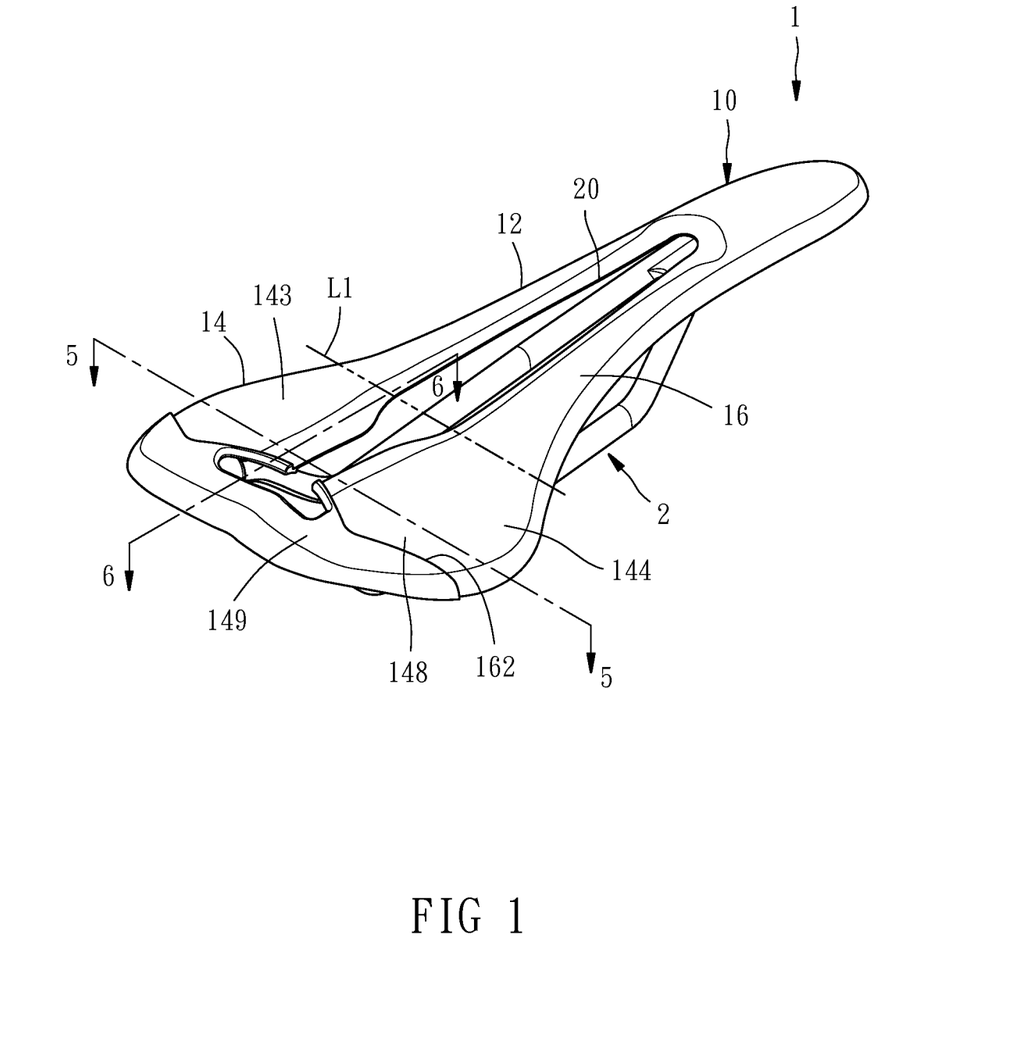
FIG. 1 is an assembled perspective view of a shell for a bicycle saddle and a supporting frame according to a first preferred embodiment of the present invention.
Figure 2:
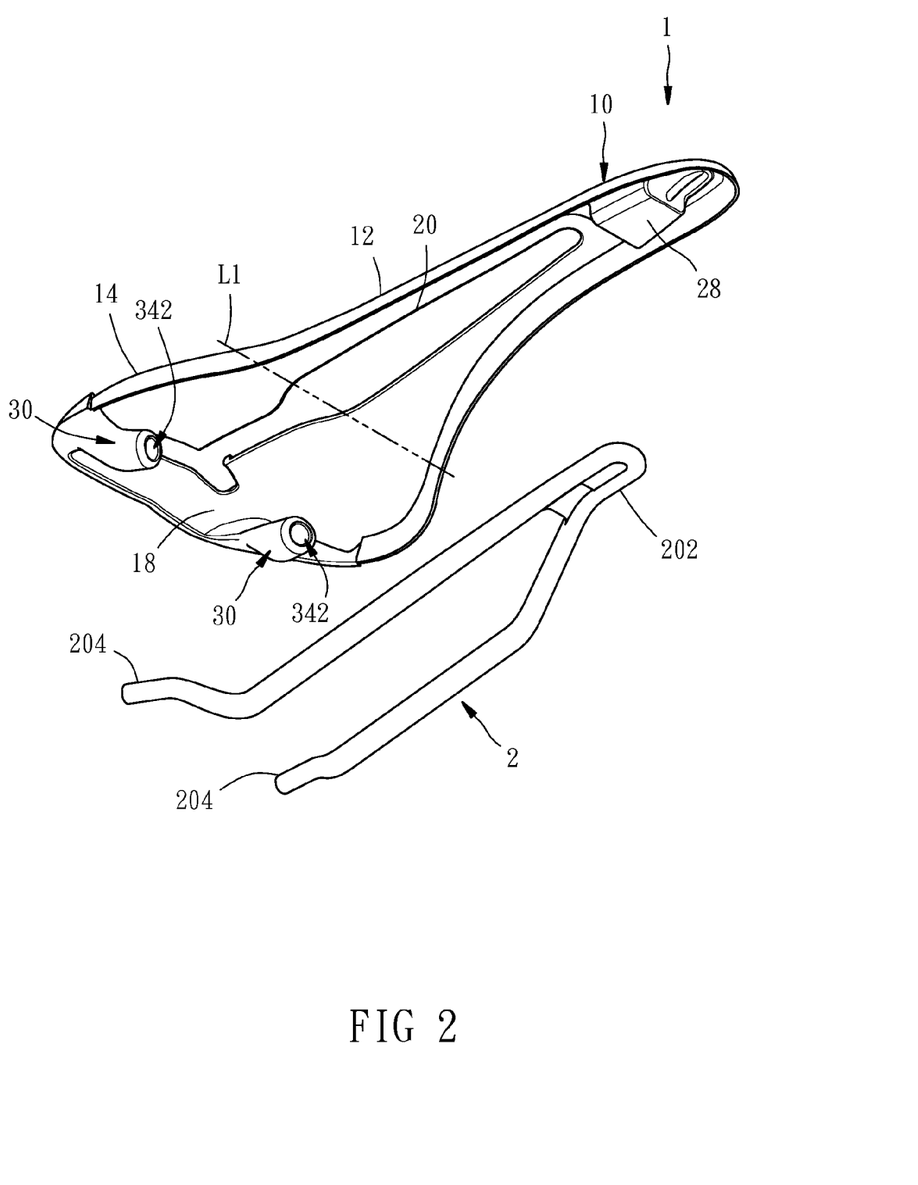
FIG. 2 is an exploded perspective view of the shell and the supporting frame according to the first preferred embodiment of the present invention.

Referring to FIGS. 1-2, a shell 1 for a bicycle saddle according to a first preferred embodiment of the present invention is adapted to be connected with a supporting frame 2 and then installed on a seat post (not shown) of a bicycle through the supporting frame 2.

Figure 3:
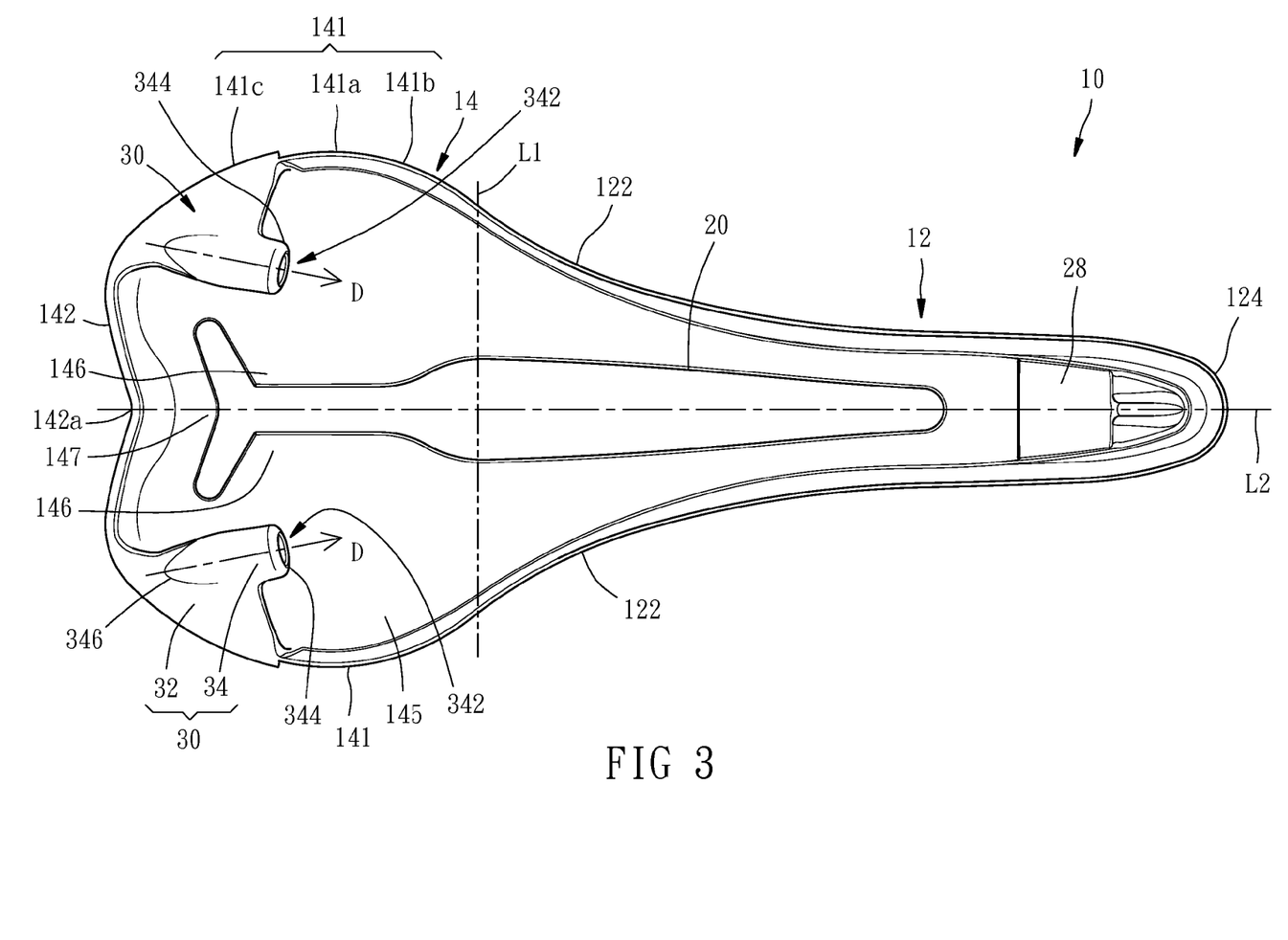
FIG. 3 is a bottom view of the shell according to the first preferred embodiment of the present invention.

The shell 1 comprises a body 10 which may be made of rigid material or semi-rigid material. In this embodiment, the body 10 is made of fiber reinforced plastic. As shown in FIGS. 1-2, the body 10 is approximately divided by an imaginary boundary line L1 into a narrow anterior portion 12 and a wide posterior portion 14 extending backwards from the narrow anterior portion 12 and wider than the narrow anterior portion 12. The narrow anterior portion 12 is adapted for fitting between a cyclist's crotch, and the wide posterior portion 14 is adapted for supporting the cyclist's buttocks. Referring to FIG. 3, in this embodiment, two lateral edges 122 of the narrow anterior portion 12 both have a concave arch section connected with the imaginary boundary line L1, and two lateral edges 141 of the wide posterior portion 14 are substantially shaped as convex arcs and connected with two ends of a concave rear edge 142 of the wide posterior portion 14, respectively.

The body 10 is provided with a top surface 16, a bottom surface 18, and a groove 20 opened through the top surface 16 and the bottom surface 18. As shown in FIG. 3, the body 10 is defined with an imaginary longitudinal axis L2 which substantially passes through a front edge 124 of the narrow anterior portion 12, the rear edge 142 of the wide posterior portion 14 and the groove 20, and divides the wide posterior portion 14 into a left region 143 and a right region 144, as shown in FIG. 1.

Figure 4:
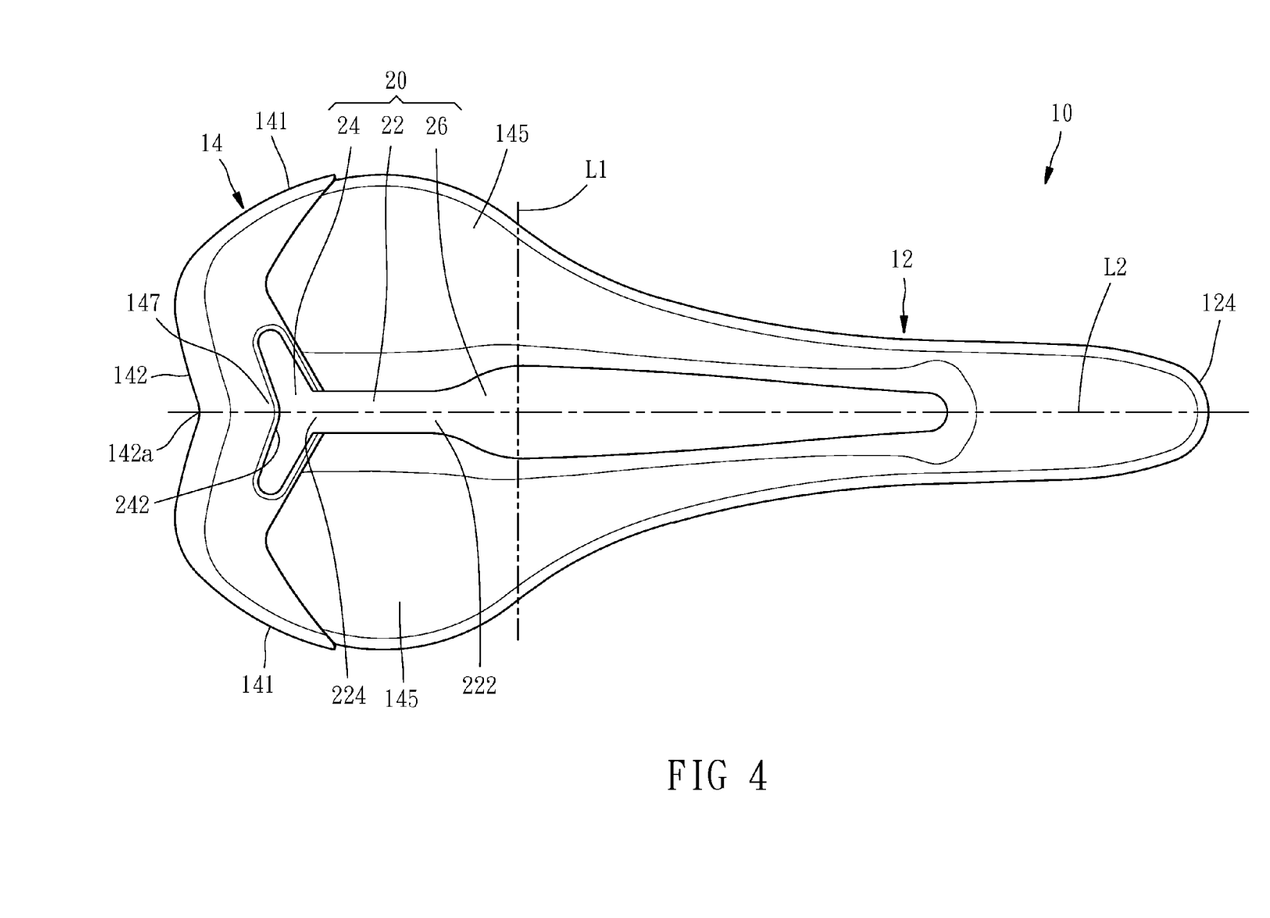
FIG. 4 is a top view of the shell according to the first preferred embodiment of the present invention.

Referring to FIG. 4, the groove 20 is provided at the wide posterior portion 14 with a longitudinal section 22 and a transverse section 24, and an extending section 26 extending from the wide posterior portion 14 to the narrow anterior portion 12. The longitudinal section 22 has a front end 222 and a rear end 224, and extends from the front end 222 substantially along the imaginary longitudinal axis L2 toward the rear edge 142 to the rear end 224. The transverse section 24 extends from the rear end 224 of the longitudinal section 22 to the left region 143 and the right region 144 of the wide posterior portion 14.

Resulted from the groove 20, the wide posterior portion 14 is provided at outer sides of the left and right regions 143, 144 with two outer wings 145 capable of swinging elastically. Besides, each lateral edge 141 of the wide posterior portion 14 is shaped as an arc and defined with a convex point 141a which is the most distant point of the lateral edge 141 from the imaginary longitudinal axis L2, and an anterior section 141b and a posterior section 141c extending from the convex point 141a substantially toward the front edge 124 and the rear edge 142 respectively, as shown in FIG. 3, so that the two lateral edges 141 are completely contained in the two outer wings 145, respectively. In addition, because the rear edge 142 is concaved and has a concave point 142a substantially passed by the imaginary longitudinal axis L2, the rear edge 142 extends from the concave point 142a toward two directions (upper left and lower left in FIG. 4) not perpendicular to the imaginary longitudinal axis L2 to depart from the front edge 124, so that parts of the rear edge 142 are also contained in the two outer wings 145.

Resulted from the longitudinal section 22 and the transverse section 24 of the groove 20, the wide posterior portion 14 is provided at inner sides of the left and right regions 143, 144 with two elastic wings 146 adjacent to the groove 20 and capable of swinging elastically, as shown in FIG. 3. In this embodiment, the transverse section 24 extends from the rear end 224 of the longitudinal section 22 toward two directions (upper left and lower left in FIG. 4) not perpendicular to the imaginary longitudinal axis L2 to depart from the front edge 124, and the longitudinal section 22 is substantially constant in width from the front end 222 to the rear end 224 thereof, so that the two elastic wings 146 are configured to be relatively larger and have better elasticity.

Besides, the transverse section 24 of the groove 20 has a convex edge 242 facing the rear end 224 of the longitudinal section 22, as shown in FIG. 4, so that the wide posterior portion 14 has a convex sheet 147 protruding toward the rear end 224 of the longitudinal section 22, and the convex sheet 147 is somewhat swingable elastically.

The extending section 26 of the groove 20 extends from the front end 222 of the longitudinal section 22 substantially along the imaginary longitudinal axis L2 to the narrow anterior portion 12, thereby not only increasing the elasticity of the two elastic wings 146 but also making the narrow anterior portion 12 a little swingable elastically at two sides of the extending section 26. In this embodiment, the extending section 26 is increasing in width first and then decreasing in width from the front end 222 of the longitudinal section 22 toward the front edge 124; besides, the extending section 26 is decreasing in width substantially from the imaginary boundary line L1 toward the front edge 124; such configuration design increases the elasticity of the shell.

Figure 7:
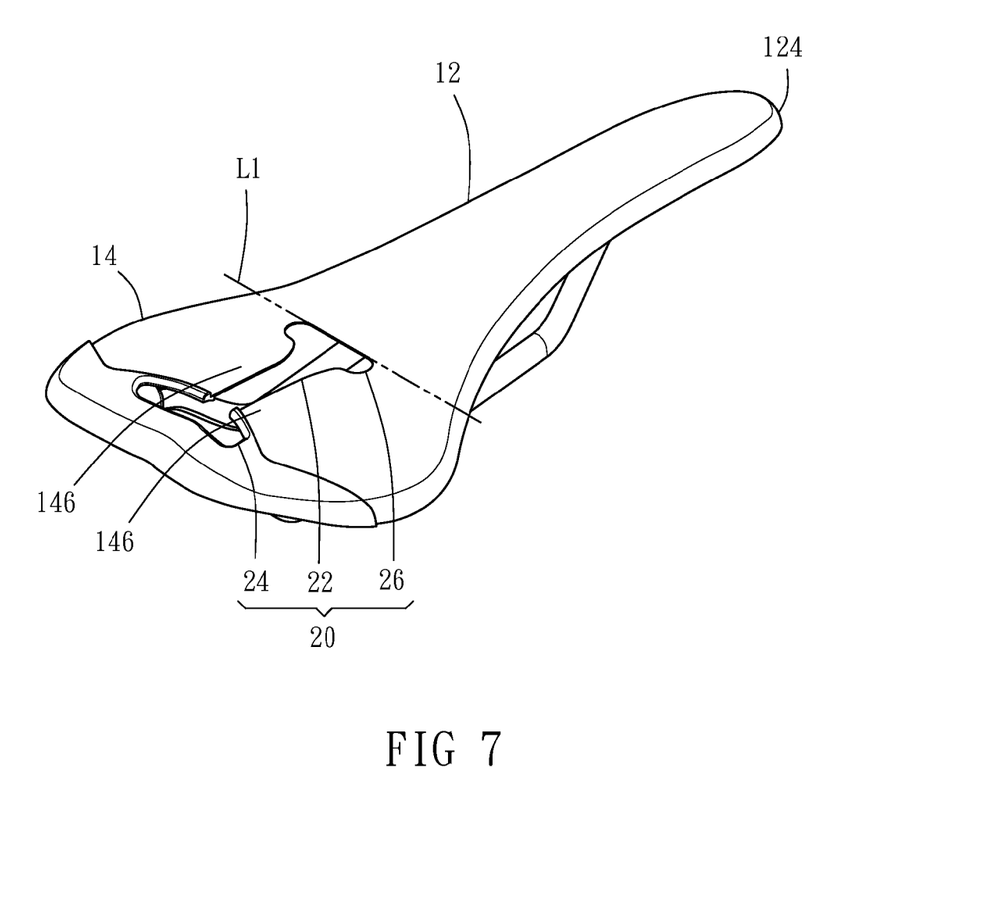
FIG. 7 is an assembled perspective view of a shell for a bicycle saddle and a supporting frame according to a second preferred embodiment of the present invention.

Such as a shell for a bicycle saddle according to a second preferred embodiment of the present invention shown in FIG. 7, the groove 20 can be provided completely in the wide posterior portion 14, instead of extending to the narrow anterior portion 12. In FIG. 7, the groove 20 also has the extending section 26 extending from the longitudinal section 22 toward the front edge 124 and wider than the longitudinal section 22, so that the shell in FIG. 7 also has elastic wings 146 having great elasticity.

Figure 5:
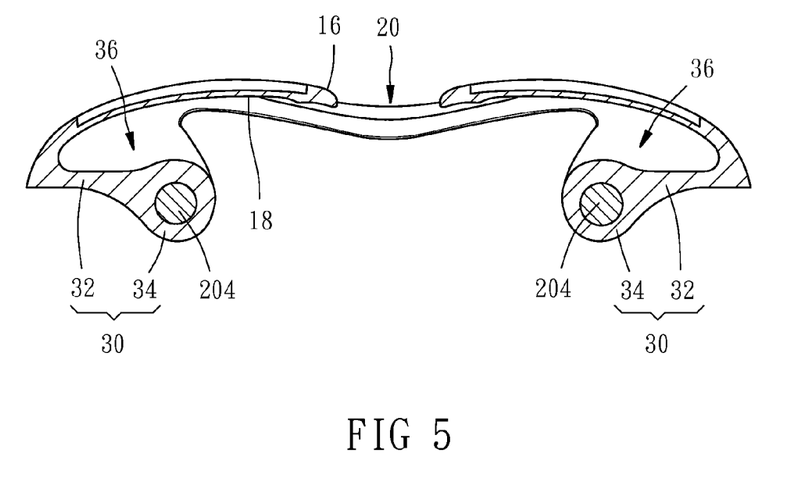
FIG. 5 is a sectional view taken along the line 5-5 in FIG. 1.

As shown in FIGS. 2-3, the body 10 further has a retaining bracket 28 and two sockets 30. The retaining bracket 28 protrudes from the bottom surface 18 and has a slot (not shown) for insertion of a front end portion 202 of the supporting frame 2. The two sockets 30 are located at the left region 143 and the right region 144 of the wide posterior portion 14, respectively. Each of the sockets 30 has a connecting sheet 32 extending from the rear edge 142 and one of the lateral edges 141 of the wide posterior portion 14 to a position under the bottom surface 18, and an insertion block 34 connected with the connecting sheet 32 and provided with a hole 342. The holes 342 of the two insertion blocks 34 are adapted for insertion of two rear end portions 204 of the supporting frame 2, respectively. As shown in FIG. 5, a space 36 is provided between each of the sockets 30 and the bottom surface 18 so as to enable the sockets 30 to swing elastically.

As shown in FIG. 3, the junctures of the connecting sheets 32 of the two sockets 30 and the wide posterior portion 14 extend respectively from the posterior sections 141c of the two lateral edges 141 to the rear edge 142, so that the sockets 30 can be configured to be relatively smaller in area thereof but connected with the wide posterior portion 14 firmly. Besides, because the connecting sheets 32 are connected with the rear edge 142, the wide posterior portion 14 is supported by the rear end portions 204 of the supporting frame 2 through the two sockets 30 at the junctures of the rear edge 142 and the two sockets 30; this means the supporting frame 2 fulcrums the wide posterior portion 14 at the rear edge 142 thereof. As a result, compared with the conventional shell wherein the sockets are connected with the inner surfaces of the shell, the shell of the present invention has better elasticity resulted from the sockets 30 which make almost the whole wide posterior portion 14 elastic and improve the elasticity of the narrow anterior portion 12. Furthermore, in each of the sockets 30, the insertion block 34 extends from the juncture of the connecting sheet 32 and the wide posterior portion 14 substantially toward an extending direction D, and has a hole 342 as aforementioned, a closed end 346, and an opening 344 opposite to the closed end 346 and toward the extending direction D. Such configuration design provides relatively better support to the wide posterior portion 14, thereby increasing the structural strength of the shell 1.

Figure 6:
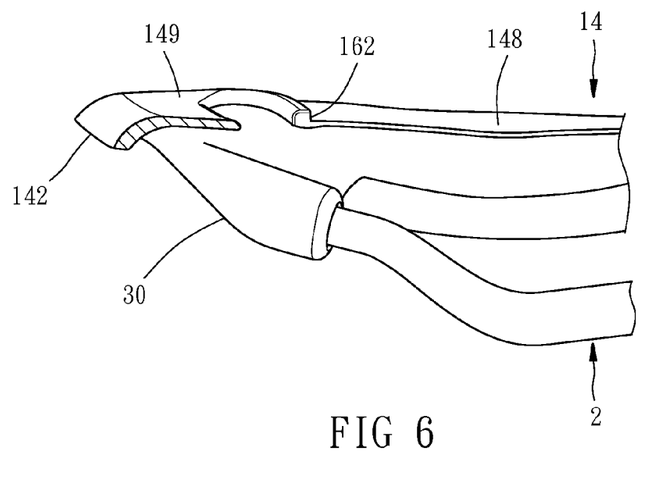
FIG. 6 is a sectional view taken along the line 6-6 in FIG. 1.

As shown in FIG. 1 and FIG. 6, the top surface 16 of the body 10 has a stair 162 which divides the wide posterior portion 14 into an anterior region 148 and a posterior region 149 thicker than the anterior region 148. The junctures of the connecting sheets 32 of the two sockets 30 and the wide posterior portion 14 are completely located at the posterior region 149. Such configuration design improves the structural strength of the two sockets 30, so the sockets 30 are less possible to be fractured. Besides, the transverse section 24 of the groove 20 is completely located at the posterior region 149, and the longitudinal section 22 is located at the anterior region 148. Such configuration design causes great elasticity and structural strength to the two elastic wings 146 and improves the structural strength of the whole shell 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shell for a bicycle saddle, comprising:
a flat body provided with a top surface, a bottom surface, a groove through the top surface and the bottom surface, a narrow anterior portion for fitting between a cyclist's crotch, a wide posterior portion for supporting the cyclist's buttocks, and two sockets for insertion of a supporting frame,
wherein, the narrow anterior portion has a front edge; the wide posterior portion has a rear edge and two lateral edges extending from two ends of the rear edge substantially toward the front edge; the body is defined with an imaginary longitudinal axis which substantially passes through the front edge, the rear edge and the groove and divides the wide posterior portion into a left region and a right region,
wherein the groove is provided at the wide posterior portion and the narrow anterior portion with a longitudinal section, an extending section and a transverse section, the longitudinal section having a front end, a rear end, and a same width from the front end to the rear end, and extending from the front end substantially along the imaginary longitudinal axis toward the rear edge to the rear end, the extending section extending from the front end of the longitudinal section substantially along the imaginary longitudinal axis to the narrow anterior portion, and the transverse section extending from the rear end of the longitudinal section to the left region and the right region of the wide posterior portion toward two directions not perpendicular to the imaginary longitudinal axis to depart from the front edge so that the wide posterior portion has two elastic wings adjacent to the longitudinal section of the groove and each of the elastic wings has a straight inner side,
wherein the transverse section further has a convex edge facing the rear end of the longitudinal section so that the wide posterior portion has a convex sheet protruding toward the rear end of the longitudinal section,
wherein the narrow anterior portion and the wide posterior portion are separated by an imaginary boundary line, and the extending section of the groove is decreasing in width substantially from the imaginary boundary line toward the front edge, and
wherein the two sockets are located at the left region and the right region of the wide posterior portion respectively; each of the sockets has a connecting sheet connected with the rear edge and one of the lateral edges of the wide posterior portion and extending to a position under the bottom surface, and an insertion block connected with the connecting sheet; an open chamber is provided between the connecting sheet and the insertion block of each of the sockets and the bottom surface.

2. The shell as claimed in claim 1, wherein each of the lateral edges is shaped as an arc and defined with a convex point which is the most distant point of the lateral edge from the imaginary longitudinal axis, and an anterior section and a posterior section extending from the convex point substantially toward the front edge and the rear edge respectively; two junctures of the connecting sheets of the two sockets and the wide posterior portion extend respectively from the posterior sections of the two lateral edges to the rear edge.

3. The shell as claimed in claim 1, wherein the rear edge has a concave point substantially passed by the imaginary longitudinal axis; the rear edge extends from the concave point toward two directions not perpendicular to the imaginary longitudinal axis to depart from the front edge.

4. The shell as claimed in claim 1, wherein the top surface of the body has a stair which divides the wide posterior portion into an anterior region and a posterior region thicker than the anterior region; two junctures of the connecting sheets of the two sockets and the wide posterior portion are located at the posterior region.

5. The shell as claimed in claim 4, wherein the longitudinal section and the transverse section of the groove are located at the anterior region and the posterior region, respectively.

6. The shell as claimed in claim 5, wherein each of the lateral edges is shaped as an arc and defined with a convex point which is the most distant point of the lateral edge from the imaginary longitudinal axis, and an anterior section and a posterior section extending from the convex point substantially toward the front edge and the rear edge respectively; two junctures of the connecting sheets of the two sockets and the wide posterior portion extend respectively from the posterior sections of the two lateral edges to the rear edge; each of the sockets is defined with an extending direction; in each of the sockets, the insertion block extends from the juncture of the connecting sheet and the wide posterior portion substantially toward the extending direction and has a closed end, and an opening opposite to the closed end and toward the extending direction; the rear edge has a concave point substantially passed by the imaginary longitudinal axis; the rear edge extends from the concave point toward two directions not perpendicular to the imaginary longitudinal axis to depart from the front edge.

7. The shell as claimed in claim 6, wherein the transverse section of the groove extends from the rear end of the longitudinal section toward two directions not perpendicular to the imaginary longitudinal axis to depart from the front edge; the transverse section of the groove has a convex edge facing the rear end of the longitudinal section so that the wide posterior portion has a convex sheet protruding toward the rear end of the longitudinal section; the extending section is increasing in width first and then decreasing in width from the front end of the longitudinal section toward the front edge; the narrow anterior portion and the wide posterior portion are separated by an imaginary boundary line; the extending section of the groove is decreasing in width substantially from the imaginary boundary line toward the front edge.

\* \* \* \* \*